(12) United States Patent
Ohta

(10) Patent No.: US 12,054,136 B2
(45) Date of Patent: Aug. 6, 2024

(54) VEHICLE CONTROL DEVICE, VEHICLE CONTROL METHOD AND RECORDING MEDIUM

(71) Applicant: HONDA MOTOR CO., LTD., Tokyo (JP)

(72) Inventor: Takashi Ohta, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 270 days.

(21) Appl. No.: 17/678,079

(22) Filed: Feb. 23, 2022

(65) Prior Publication Data

US 2022/0289166 A1  Sep. 15, 2022

(30) Foreign Application Priority Data

Mar. 12, 2021 (JP) ................. 2021-040374

(51) Int. Cl.
   *B60W 20/13* (2016.01)
   *B60W 20/12* (2016.01)
   (Continued)

(52) U.S. Cl.
   CPC ............ *B60W 20/13* (2016.01); *B60W 20/12* (2016.01); *B60W 20/20* (2013.01); *B60K 6/442* (2013.01);
   (Continued)

(58) Field of Classification Search
   CPC ...... B60W 20/12; B60W 20/13; B60W 20/20; B60W 2552/10; B60W 2552/15;
   (Continued)

(56) References Cited

U.S. PATENT DOCUMENTS 10,457,269 B2 * 10/2019 Sugiyama ............. B60W 20/20
2016/0332616 A1 * 11/2016 Zhao .................... B60W 10/08
(Continued)

FOREIGN PATENT DOCUMENTS

JP          2005-168295      6/2005
JP             6344429       6/2018

*Primary Examiner* — Jaime Figueroa
*Assistant Examiner* — Zachary Joseph Wallace
(74) *Attorney, Agent, or Firm* — Amin, Turocy & Watson, LLP

(57) ABSTRACT

A vehicle control device includes power source, electrical storage device, electric motor connected to driving wheel, able to be driven by supply of electric power from electrical storage device and supplys regenerative electric power generated upon regenerative operation to electrical storage device, a road information acquisition part acquires road information related to scheduled traveling route of the vehicle, a control target segment extraction part extracts control target segment, in which change of remaining capacity of the electrical storage device equal to or greater than predetermined value is predicted, on scheduled traveling route, and a charge/discharge planning part plans charge/discharge of the electrical storage device based on vehicle traveling load in road from the vehicle to the control target segment, and the charge/discharge planning part determines the vehicle traveling load of the segment located before the control target segment according to attribute of the control target segment.

7 Claims, 8 Drawing Sheets

(51) Int. Cl.
*B60W 20/20* (2016.01)
*B60K 6/442* (2007.10)

(52) U.S. Cl.
CPC ... *B60W 2510/244* (2013.01); *B60W 2720/10* (2013.01); *B60Y 2200/92* (2013.01)

(58) Field of Classification Search
CPC ....... B60W 2552/05; B60W 2554/406; B60W 2710/244; B60W 2720/10; B60W 2510/244; B60Y 2200/92; B60K 6/442
See application file for complete search history.

(56) References Cited

U.S. PATENT DOCUMENTS

| | | | |
|---|---|---|---|
| 2017/0355358 A1* | 12/2017 | Ogawa | B60W 10/00 |
| 2022/0169235 A1* | 6/2022 | Cheng | G01C 21/3469 |
| 2022/0194355 A1* | 6/2022 | Wray | B60W 20/20 |
| 2022/0357162 A1* | 11/2022 | Okuda | G08G 1/0969 |
| 2023/0150474 A1* | 5/2023 | Cancel | G01C 21/3469 |
| | | | 701/22 |
| 2023/0152110 A1* | 5/2023 | Berney-Dale | G01C 21/3469 |
| | | | 701/123 |

* cited by examiner

VEHICLE CONTROL DEVICE, VEHICLE CONTROL METHOD AND RECORDING MEDIUM

CROSS-REFERENCE TO RELATED APPLICATION

Priority is claimed on Japanese Patent Application No. 2021-040374, filed Mar. 12, 2021, the content of which is incorporated herein by reference.

BACKGROUND OF THE INVENTION

Field of the Invention

The present invention relates to a vehicle control device, a vehicle control method and a recording medium.

Description of Related Art

A hybrid vehicle having a power source such as an internal combustion engine or the like, an electrical storage device, and an electric motor is used. The electric motor is connected to a driving wheel, and can be driven by supply of electric power from the electrical storage device. The electric motor can supply regenerative electric power generated upon a regenerative operation to the electrical storage device.

A technology related to a charge/discharge schedule of an electrical storage device of a hybrid vehicle has been proposed. For example, in a case the downgrade that satisfies a predetermined condition is detected, a technology of setting a target SOC of a battery to a first SOC that is lower than a standard SOC and starting discharge from a point which is predetermined distance away from a downgrade has been proposed (see Japanese Patent No. 6344429). In addition, a technology of estimating a vehicle speed pattern in a segment on a route from driving history of a driver and setting a charge/discharge schedule has been proposed (see Japanese Unexamined Patent Application, First Publication No. 2005-168295).

SUMMARY OF THE INVENTION

In the technology disclosed in Japanese Patent No. 6344429, if a driver tends to have a vehicle speed lower than the average, since a traveling load of a vehicle will be small, it may not be possible to use up the electric power before reaching the downgrade. In addition, in the technology disclosed in Japanese Unexamined Patent Application, First Publication No. 2005-168295, since there is little data for a road if the driver passes a road which the driver does not pass frequently, accuracy of estimation of the vehicle speed may be low.

An aspect of the present invention is directed to providing a vehicle control device, a vehicle control method and a recording medium that are capable of minimizing influence due to driving properties.

A vehicle control device, a vehicle control method and a recording medium according to the present invention employ the following configurations.

(1) A vehicle control device according to an aspect of the present invention includes a power source; an electrical storage device; an electric motor connected to a driving wheel, able to be driven by supply of electric power from the electrical storage device, and configured to supply regenerative electric power generated upon a regenerative operation to the electrical storage device; a road information acquisition part configured to acquire road information related to a scheduled traveling route of the vehicle; a control target segment extraction part configured to extract a control target segment, in which a change of a remaining capacity of the electrical storage device equal to or greater than a predetermined value is predicted, on the scheduled traveling route; and a charge/discharge planning part configured to plan charge/discharge of the electrical storage device on the basis ofs vehicle traveling load on a road from the vehicle to the control target segment, wherein the charge/discharge planning part determines the vehicle traveling load of a segment located before the control target segment according to an attribute of the control target segment.

(2) In the aspect of the above-mentioned (1), when an estimated value of a regenerated energy amount in the control target segment is equal to or greater than a threshold, the charge/discharge planning part determines the vehicle traveling load of the segment located before the control target segment as a value lower than a reference value.

(3) In the aspect of the above-mentioned (1) or (2), when an estimated value of a discharged energy amount of the control target segment is equal to or greater than a threshold, the charge/discharge planning part determines the vehicle traveling load of the segment located before the control target segment as a value higher than a reference value.

(4) In the aspect of any one of the above-mentioned (1) to (3), the charge/discharge planning part is configured to calculate the vehicle traveling load on the basis of a vehicle speed information included in the road information acquired by the road information acquisition part, and the charge/discharge planning part is configured to determine the vehicle traveling load by correcting the vehicle speed.

(5) In the aspect of the above-mentioned (4), the road information acquisition part is configured to acquire vehicle speed distribution information included in the road information, and the charge/discharge planning part determines a correction amount of the vehicle speed on the basis of the vehicle speed distribution information.

(6) In the aspect of the above-mentioned (4) or (5), the road information acquisition part is configured to acquire road attribute information, and the charge/discharge planning part determines a correction amount of the vehicle speed on the basis of the road attribute information.

(7) In the aspect of any one of the above-mentioned (4) to (6), the vehicle control device further includes a target remaining capacity calculation part configured to calculate a target remaining capacity that is a remaining capacity of the electrical storage device at a starting point of the control target segment, and the charge/discharge planning part determines a correction amount of the vehicle speed according to a difference between the remaining capacity and the target remaining capacity of the electrical storage device.

(8) In the aspect of any one of the above-mentioned (4) to (7), the charge/discharge planning part determines a correction amount of the vehicle speed on the basis of a distance or time until the vehicle arrives at a starting point of the control target segment.

(9) A vehicle control method according to another aspect of the present invention is executed by a computer mounted in a vehicle, the method including: acquiring road information related to a scheduled traveling route of the vehicle; extracting a control target segment, in which a change of a remaining capacity of an electrical storage device equal to or greater than a predetermined value is predicted, on the scheduled traveling route; planning charge/discharge of the electrical storage device on the basis of a vehicle traveling load on a road from the vehicle to the control target segment; and determining the vehicle traveling load of a segment located before the control target segment according to an attribute of the control target segment when charge/discharge of the electrical storage device is planned.

(10) A computer-readable recording medium according to another aspect of the present invention storing a program is configured to cause a computer mounted in a vehicle to: acquire road information related to a scheduled traveling route of the vehicle; extract a control target segment, in which a change of a remaining capacity of an electrical storage device equal to or greater than a predetermined value is predicted, on the scheduled traveling route; plan charge/discharge of the electrical storage device on the basis of a vehicle traveling load on a road from the vehicle to the control target segment; and determine the vehicle traveling load of a segment located before the control target segment according to an attribute of the control target segment when charge/discharge of the electrical storage device is planned.

According to the aspects of the above-mentioned (1), (9) and (10), the vehicle traveling load of the segment located before the control target segment is determined according to a type of an event occurring in the control target segment, the charge/discharge capacity amount of the electrical storage device can be adjusted, and an influence due to driving properties can be minimized.

According to the aspect of the above-mentioned (2), when it is determined that the control target segment is a regeneration segment, both vehicles with faster and slower actual vehicle speeds can lower the remaining capacity of the electrical storage device before entering the regeneration segment by underestimating the vehicle traveling load, and the regenerative electric power can be fully collected.

According to the aspect of the above-mentioned (3), when it is determined that the control target segment is a discharge segment, both vehicles with faster and slower actual vehicle speeds can increase the remaining capacity of the electrical storage device before entering the discharge segment by overestimating the vehicle traveling load, and assistance electric power in the discharge segment can be secured.

According to the aspect of the above-mentioned (4), since the vehicle traveling load is also affected by a vehicle specification or the like, while only similar vehicle specification information can be used, on the other hand, by calculating the vehicle traveling load using the vehicle speed information, statistic information of more vehicles becomes able to be used, and the vehicle traveling load with high accuracy can be obtained.

According to the aspect of the above-mentioned (5), since the correction amount of the vehicle speed is determined using the vehicle speed distribution information of the target road, a correction amount appropriate for each traveling segment can be set.

According to the aspect of the above-mentioned (6), since an amount of variation in vehicle speed differs depending on road attributes, the correction amount appropriate for each traveling segment can be determined by determining the correction amount of the vehicle speed according to the road attributes.

According to the aspect of the above-mentioned (7), the charge/discharge can be promoted or suppressed by adjusting the correction amount according to a difference from the target remaining capacity, and charge/discharge control can be executed more reliably.

According to the aspect of the above-mentioned (8), since the charge/discharge capacity can be adjusted based on a degree of urgency by adjusting the correction amount on the basis of the distance or time until the vehicle arrives at the starting point of the control target segment, the charge/discharge can be performed more appropriately.

DETAILED DESCRIPTION OF THE INVENTION

Hereinafter, an embodiment of a vehicle control device, a vehicle control method and a recording medium of the present invention will be described with reference to the accompanying drawings.

[Entire Configuration]

Figure 1:
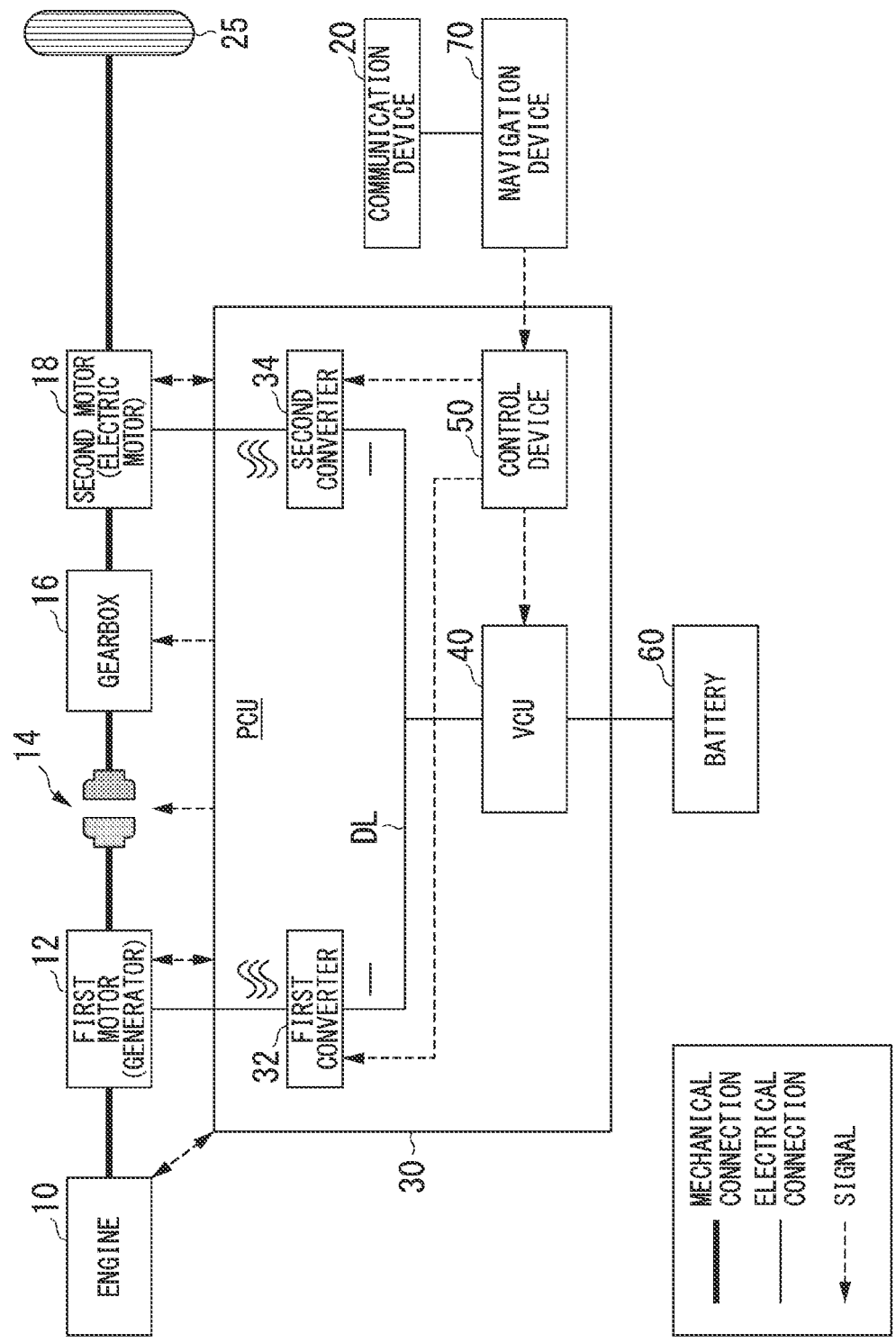
FIG. 1 is a view showing an example of a configuration of a vehicle of an embodiment.

FIG. 1 is a view showing an example of a configuration of a vehicle M of an embodiment. The vehicle M having the configuration shown is a hybrid vehicle in which a series type and a parallel type are switchable. The series type is a type in which an engine and driving wheels are not mechanically connected, power of the engine is used for generation by a dedicated generator, and the generated electric power is supplied to an electric motor for traveling. The parallel type is a type in which an engine and driving wheels can be mechanically connected (or via a fluid in a torque converter or the like), and power of the engine is transmitted to the driving wheel or used for electric generation. The vehicle M having the configuration shown in FIG. 1 can switch between the series type and the parallel type by connecting and disconnecting a lock-up clutch 14.

As shown in FIG. 1, for example, an engine (power source) 10, a first motor (generator) 12, the lock-up clutch 14, a gearbox 16, a second motor (electric motor) 18, driving wheels 25, a power control unit (PCU) 30, and a battery (electrical storage device) 60 are mounted in the vehicle M.

The vehicle M includes at least the engine 10 as a power source. The vehicle M may include a fuel cell stack as a power source.

The engine 10 is an internal combustion engine configured to output power by combusting fuel such as gasoline or the like. The engine 10 is, for example, a reciprocating engine including a combustion chamber, a cylinder, a piston, an intake valve, an exhaust valve, a fuel injection device, an ignition plug, a connecting rod, a crankshaft, and the like. The engine 10 may be a rotary engine.

The first motor 12 is, for example, a three-phase current generator. The first motor 12 has a rotor connected to an output shaft (for example, a crankshaft) of the engine 10, and generates electric power using the power output by the engine 10. The output shaft of the engine 10 and the rotor of the first motor 12 are connected to sides of the driving wheels 25 via the lock-up clutches 14.

The lock-up clutch 14 switches between a state where the output shaft of the engine 10 and the rotor of the first motor 12 are connected to the sides of the driving wheels 25 and a state in which they are disconnected from the sides of the driving wheels 25 according to an instruction from the PCU 30.

The gearbox 16 is a transmission. The gearbox 16 shifts the power output by the engine 10 and transmits the power toward the driving wheels 25. A transmission gear ratio of the gearbox 16 is designated by the PCU 30.

The second motor 18 is, for example, a three-phase current electric motor. The rotor of the second motor 18 is connected to the driving wheels 25. The second motor 18 can be driven by supply of the electric power, and outputs the power to the driving wheels 25. For example, the second motor 18 can be driven by supply of the electric power from the battery 60. In addition, the second motor 18 can supply the regenerative electric power generated upon a regenerative operation to the battery 60. The second motor 18 generates power using kinetic energy of the vehicle M upon deceleration of the vehicle M, and stores the generated electric power in the battery 60 via a second converter 34 and a voltage control unit (VCU) 40, which will be described below.

The PCU 30 includes, for example, a first converter 32, the second converter 34, the VCU 40, and a control device 50. Further, these components being configured as the PCU 30 as a group is only an example, and these components may be disposed in a distributed manner.

The first converter 32 and the second converter 34 are, for example, AC-DC converters. Direct current-side terminals of the first converter 32 and the second converter 34 are connected to a direct current link DL. The battery 60 is connected to the direct current link DL via the VCU 40. The first converter 32 converts alternating current generated by the first motor 12 into direct current and outputs the direct current to the direct current link DL, or converts the direct current supplied via the direct current link DL into alternating current and supplies the alternating current to the first motor 12. Similarly, the second converter 34 converts the alternating current generated by the second motor 18 into direct current and outputs the direct current to the direct current link DL, or converts the direct current supplied via the direct current link DL into alternating current and supplies the alternating current to the second motor 18.

The VCU 40 is, for example, a DC-DC converter. The VCU 40 boosts the electric power supplied from the battery 60 and outputs the electric power to the direct current link DL.

A function of the control device 50 will be described. The battery 60 is a secondary battery such as a lithium ion battery or the like.

A navigation device 70 includes, for example, a global navigation satellite system (GNSS) receiver, a navigation human machine interface (HMI), and a route determination unit. The navigation device 70 stores map information and road information in a storage device such as a hard disk drive (HDD), a flash memory, or the like. The GNSS receiver specifies a position of a host vehicle M on the basis of a signal received from a GNSS satellite. The navigation HMI includes a display device, a speaker, a touch panel, a key, and the like. The route determination unit determines, for example, a route (hereinafter, a scheduled traveling route) from a position of the host vehicle M specified by the GNSS receiver (or an input arbitrary position) to a destination input by an occupant using the navigation HMI with reference to map information. The map information is, for example, information in which a road shape is expressed by links showing a road and nodes connected by the links. The navigation device 70 may perform route guidance using the navigation HMI on the basis of the scheduled traveling route. The navigation device 70 may be realized by, for example, a function of a terminal device such as a smart phone, a tablet terminal, or the like, owned by an occupant. The navigation device 70 may transmit a current position and a destination to a navigation server via a communication device 20 and acquire the same route as the scheduled traveling route from the navigation server. The navigation device 70 may acquire the road information from the navigation server.

Figure 2:
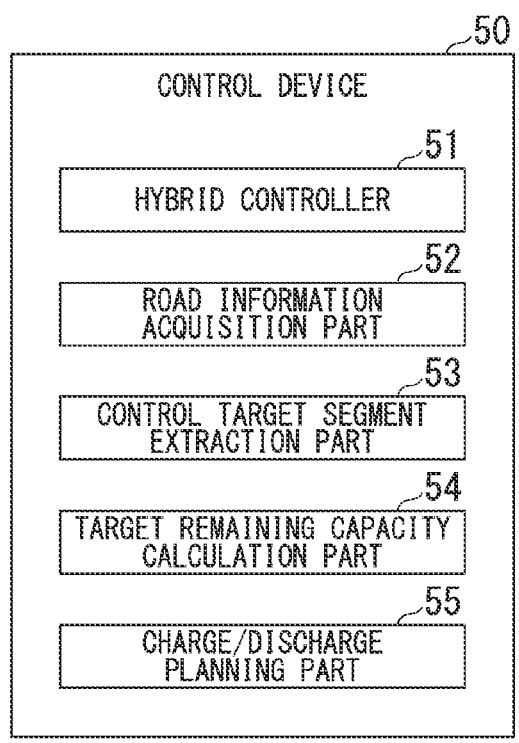
FIG. 2 is a view showing an example of a functional configuration of a control device.

FIG. 2 is a view showing an example of a functional configuration of the control device. The control device 50 includes, for example, a hybrid controller 51, a road information acquisition part 52, a control target segment extraction part 53, a target remaining capacity calculation part 54, and a charge/discharge planning part 55. These components are realized by executing a program (software) using, for example, a hardware processor such as a central processing unit (CPU) or the like of a computer mounted in the vehicle M. In addition, some or all of these components may be realized by hardware (a circuit part; including circuitry) such as large scale integration (LSI), an application specific integrated circuit (ASIC), a field-programmable gate array (FPGA), a graphics processing unit (GPU), or the like, or may be realized by software and hardware in cooperation. The program may be previously stored in a storage device (a storage device including a non-transient recording medium) such as a hard disk drive (HDD), a flash memory, or the like, may be stored in a detachable recording medium (non-transient recording medium) such as a DVD, a CD-ROM, or the like, or may be installed by mounting a recording medium in a drive device.

The hybrid controller 51 determines a traveling mode on the basis of an accelerator open degree, a vehicle speed, a brake pedal pressure, or the like, of the vehicle M. The control device 50 controls an operation of the engine 10, the first motor 12, the lock-up clutch 14, the second motor 18, or the like, according to the traveling mode.

[Various Traveling Modes]

Hereinafter, traveling modes determined by the hybrid controller 51 will be described. The traveling modes include the following modes.

(1) Series Hybrid Traveling Mode (ECVT)

In a series hybrid traveling mode, the hybrid controller 51 makes the lock-up clutch 14 in a separate state, supplies fuel to the engine 10 and operates the engine, and provides the electric power generated by the first motor 12 to the battery 60 and the second motor 18. Then, the second motor 18 is driven using the electric power supplied from the first motor 12 or the battery 60, and the vehicle M travels using the power from the second motor 18. The series hybrid traveling mode is an example of a mode in which "the internal combustion engine is operated in a state in which the internal combustion engine and the driving wheels are not mechanically connected."

(2) EV Traveling Mode (EV)

In an EV traveling mode, the hybrid controller 51 makes the lock-up clutch 14 in a separated state and drives the second motor 18 using the electric power supplied from the battery 60, and the vehicle M travels using the power from the second motor 18.

(3) Engine Drive Traveling Mode (LU)

In an engine drive traveling mode, the hybrid controller 51 makes the lock-up clutch 14 in a connected state, the engine 10 is operated by consuming fuel, and at least some of the power output from the engine 10 is transmitted to the driving wheels 25 to cause the vehicle M to travel. Here, the first motor 12 may or may not perform power generation.

(4) Regeneration

Upon regeneration, the hybrid controller 51 makes the lock-up clutch 14 in a separated state, and causes the second motor 18 to generate power using kinetic energy of the vehicle M. The electric power generated upon regeneration is stored in the battery 60 or discarded by power discarding control. In the power discarding control, the regenerative electric power of the second motor 18 is not charged to the battery 60 and supplied to the first motor 12. In a state in which the lock-up clutch 14 is disconnected, when the engine 10 is idled by the first motor 12, the regenerative electric power is discarded (i.e., power discarding).

The road information acquisition part 52 acquires road information of a scheduled traveling route of the vehicle M via the navigation device 70. The scheduled traveling route is divided into a plurality of segments. The road information acquisition part 52 acquires road information of each segment of the scheduled traveling route. The road information includes vehicle speed information, road attribute information, road traffic information, or the like. The vehicle speed information is information such as a regulated speed (for example, a legal speed), an average speed, vehicle speed distribution, or the like, in each segment of the scheduled traveling route. The average speed is an average value of a plurality of vehicle speeds upon traveling the segments. The road attribute information is information such as road classification (expressway or general road), a road grade, a lane number, or the like. The road traffic information is information such as traffic congestion, traffic signals, temporary stop positions, or the like.

The control target segment extraction part 53 extracts a control target segment in the scheduled traveling route of the vehicle M. The control target segment is a segment in which charge/discharge control is performed before the vehicle M arrives at the segment. The control target segment is a segment in which a change of a predetermined value or more in the remaining capacity of the battery 60 in the segments included in the scheduled traveling route is predicted. The control target segment extraction part 53 acquires event information of the segment included in the scheduled traveling route via the road information acquisition part 52. The event is a charge event and a discharge event. The charge event is an event in which the battery 60 is charged as the vehicle M travels in a regeneration mode. For example, the charge event is traveling downhill, deceleration before stopping, or the like. The discharge event is an event in which the battery 60 is discharged as the vehicle M travels in an EV traveling mode or travels through assistance with the battery 60. For example, the discharge event is traveling uphill, traffic congestion, acceleration after departure, destination arrival (traveling in a quiet place such as a residential area or the like), or the like. For example, in the case of the traveling uphill or the like, the vehicle travels in a series hybrid traveling mode in addition to the assistance output from the battery 60. The control target segment extraction part 53 acquires information such as a road grade, traffic congestion, traffic regulations, a destination, or the like, as event information. The control target segment extraction part 53 acquires regenerated energy amount or discharged energy amount of the battery 60 as the vehicle M travels along a segment in which the event occurs. In the segment in which an estimated value of the regenerated energy amount or discharged energy amount of the battery 60 is equal to or greater than a threshold, a change of the remaining capacity of the battery 60 equal to or greater than the predetermined value is predicted. The control target segment extraction part 53 extracts the segment as a control target segment.

The target remaining capacity calculation part 54 calculates a target remaining capacity that is a remaining capacity of the battery 60 at a starting point of the control target segment. The target remaining capacity calculation part 54 calculates a target remaining capacity on the basis of the estimated value of the regenerated energy amount of the control target segment in a case the charge event occurs in the control target segment. The target remaining capacity calculation part 54 calculates a target remaining capacity by subtracting the estimated value of the regenerated energy amount from the remaining capacity upon power discarding starting when power discarding control is started.

The target remaining capacity calculation part 54 calculates a target remaining capacity on the basis of the estimated value of the discharged energy amount of the control target segment when the discharge event occurs in the control target segment. The target remaining capacity calculation part 54 calculates a target remaining capacity by adding the estimated value of the discharged energy amount to the assistance lower limit remaining capacity. The assistance lower limit remaining capacity is a lower limit value of the remaining capacity of the battery 60 that can supply the electric power of the battery 60 to the second motor 18 and assist the traveling of the vehicle M.

The charge/discharge planning part 55 plans the charge/discharge of the battery 60. The charge/discharge planning part 55 plans the discharge of the battery 60 in the segment before the control target segment when the regenerated energy amount of the control target segment is equal to or greater than the predetermined value. The charge/discharge planning part 55 determines the difference between the current remaining capacity and the target remaining capacity of the battery 60 as the target discharged energy amount. The charge/discharge planning part 55 plans the discharge such that the target discharged energy amount is discharged from the battery 60 before the vehicle M arrives at the starting point of the control target segment. Accordingly, since the regenerated energy amount in the control target segment is charged in the battery 60 and the power discarding control is not performed, the regenerated energy amount of the control target segment can be totally collected.

The charge/discharge planning part 55 plans the charge of the battery 60 in the segment before the control target segment when the discharged energy amount of the control target segment is equal to or greater than the predetermined value. The charge/discharge planning part 55 determines the difference between the target remaining capacity and the current remaining capacity of the battery 60 as the target charge electric energy amount. The charge/discharge planning part 55 plans the charge such that the target charge electric energy amount is charged to the battery 60 before the vehicle M arrives at the starting point of the control target segment. Accordingly, the electric power of the battery 60 can be supplied to the second motor 18 to assist the traveling of the vehicle M while the vehicle M travels the control target segment. A vehicle traveling load in the control target segment is secured, and a vehicle speed of the vehicle M is maintained.

The charge/discharge planning part 55 plans the charge/discharge of the battery 60 on the basis of the vehicle traveling load in the road from the vehicle M to the control target segment. As described above, the road information acquisition part 52 acquires the road information of each segment of the scheduled traveling route. The road information includes average vehicle speed information and road grade information. The charge/discharge planning part 55 calculates a vehicle traveling load to the control target segment on the basis of the average vehicle speed information and the road grade information. First, the charge/discharge planning part 55 calculates a shaft end driving force MF of the second motor 18 on the basis of the following mathematical expression 1

$$MF = \{(a + b \cdot V + c \cdot V^2) + M \cdot g \cdot \sin \theta\} / TME \quad (1)$$

Here, MF is a second motor shaft end driving force, V is a vehicle speed, a, b and c are traveling resistance calculation coefficients, M is an assumption weight of the vehicle M (assuming that two persons get in the vehicle), g is gravity acceleration, θ is a road grade, and TME is efficiency of the gearbox 16. The charge/discharge planning part 55 calculates a second motor shaft end driving force MF by substituting the average vehicle speed V0 for the vehicle speed V. Next, the charge/discharge planning part 55 calculates power consumption P of the second converter 34 on the basis of the following mathematical expression 2.

$$P = MF \cdot V + ML \quad (2)$$

Here, P is second converter end power consumption, MF is a second motor shaft end driving force, V is a vehicle speed, and ML is loss of the second motor 18. The charge/discharge planning part 55 calculates the second converter end power consumption P by substituting the average vehicle speed V0 for the vehicle speed V. The second converter end power consumption P is traveling demand electric power. The air conditioning/auxiliary machinery power consumption is air conditioning/auxiliary machinery demand electric power. The charge/discharge planning part 55 calculates vehicle demand electric power (i.e., a vehicle traveling load) by adding the traveling demand electric power and the air conditioning/auxiliary machinery demand electric power.

The vehicle traveling load required for traveling in each segment is covered by output from the engine 10 and output from the battery 60. As described above, the charge/discharge planning part 55 plans the discharge of the battery 60 in the segment before the control target segment when the regenerated energy of the control target segment is equal to or greater than the predetermined value. The charge/discharge planning part 55 plans the discharge such that the target discharged energy amount is discharged from the battery 60 before the vehicle M arrives at the starting point of the control target segment. The charge/discharge planning part 55 allocates the difference between the vehicle traveling load and the engine efficiency output to the battery output and discharges the battery 60 when the vehicle traveling load is greater than the output area with good thermal efficiency of the engine (hereinafter, referred to as an engine efficiency output). The charge/discharge planning part 55 may plan the discharge to the target discharged energy amount by restricting the charge to the battery 60.

As described above, the charge/discharge planning part 55 plans the charge of the battery 60 in the segment before the control target segment when the discharged energy amount of the control target segment is equal to or greater than the predetermined value. The charge/discharge planning part 55 plans the charge such that the target charge electric energy amount is charged to the battery 60 before the vehicle M arrives at the starting point of the control target segment. The charge/discharge planning part 55 increases the engine output to the engine efficiency output even when the vehicle traveling load is smaller than the engine efficiency output. The charge/discharge planning part 55 charges the battery 60 using the engine output that exceeds the vehicle traveling load. Accordingly, the charge to the target charge electric energy amount is planned while securing the vehicle traveling load. The charge/discharge planning part 55 may plan the charge to the target charge electric energy amount by restricting the output of the battery 60.

The hybrid controller 51 executes the charge/discharge of the battery 60 on the basis of the charge/discharge plan created by the charge/discharge planning part 55 in the segment before the control target segment.

As described above, the charge/discharge planning part 55 substitutes the average vehicle speed V0 for the vehicle speed V of the mathematical expressions 1 and 2 when the vehicle traveling load is calculated. The average vehicle speed V0 is an average vehicle speed of a plurality of vehicles that travel in each segment of the scheduled traveling route of the vehicle M. There is a possibility that the actual vehicle speed of the vehicle M is different from the average vehicle speed V0. The vehicle traveling load of the vehicle M in this case is different from the vehicle traveling load calculated by the charge/discharge planning part 55 using the mathematical expressions 1 and 2. In this case, the charge/discharge planning part 55 does not perform the charge/discharge as planned.

The charge/discharge planning part 55 determines (corrects) the vehicle traveling load according to the type of the event occurred in the control target segment. When the charge event occurs in the control target segment and the discharge is planned in the segment before the control target segment, the charge/discharge planning part 55 changes the vehicle traveling load to a value lower than the reference value. When the discharge event occurs in the control target segment and the charge is planned in the segment before the control target segment, the charge/discharge planning part 55 changes the vehicle traveling load to a value higher than the reference value. The charge/discharge planning part 55 corrects the vehicle traveling load by correcting the average vehicle speed information. These will be described below in detail.

Figure 3:
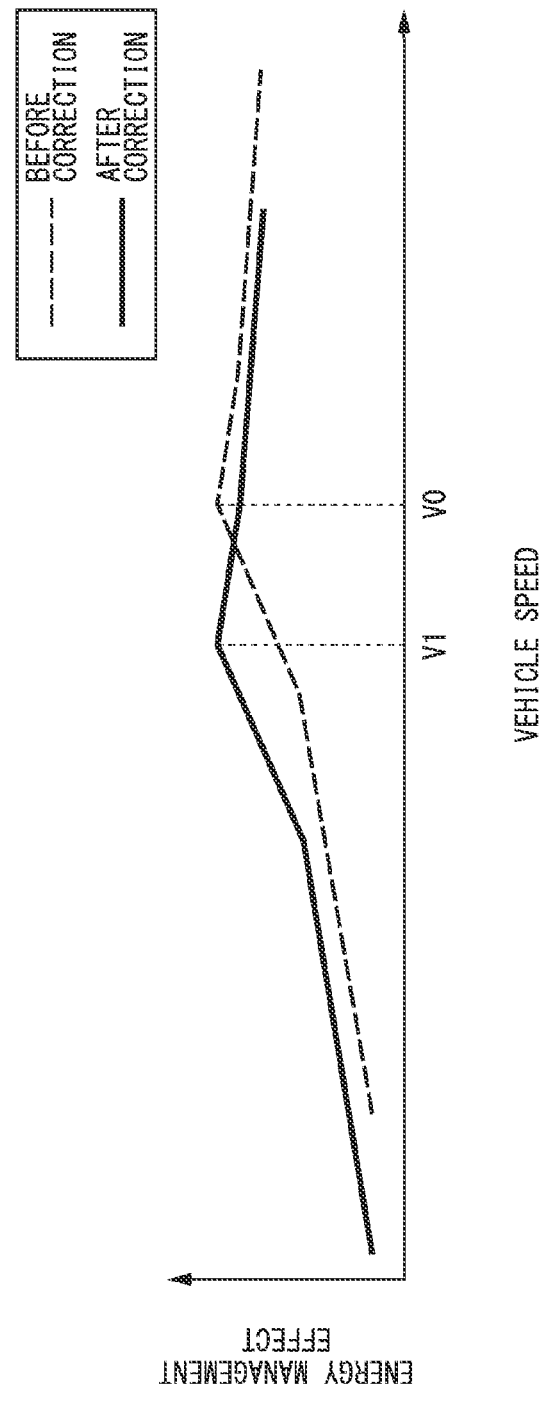
FIG. 3 is a graph showing a relation between a vehicle speed and an energy management effect in the case of a discharge plan.

FIG. 3 is a graph showing a relation between a vehicle speed and an energy management effect in the case of the discharge plan. The energy management effect is an index estimated by the fact that energy consumption is small, an energy acquisition amount is large, and the vehicle traveling load is secured. The energy is fuel of the engine 10 and electric power of the battery 60. A graph of a broken line of FIG. 3 is an energy management effect by the discharge plan created on the basis of the average vehicle speed V0 (before correction of the average vehicle speed V0). When the vehicle M travels at the average vehicle speed V0, since the discharge is performed according to the discharge plan, the energy management effect is maximized. When the vehicle M travels at a vehicle speed that is lower than the average vehicle speed V0, the vehicle traveling load calculated using the mathematical expression 1 is reduced. In this case, since the battery output gets small, the discharge to the target discharged energy amount may not be realized. As a result, the regenerated energy in the control target segment cannot be fully collected and the energy management effect is decreased. As the vehicle M travels at a vehicle speed lower than the average vehicle speed V0, a decrease in energy management effect is increased.

When the vehicle M travels at a vehicle speed higher than the average vehicle speed V0, the vehicle traveling load calculated using the mathematical expression 1 is increased. In this case, since the battery output is increased, the discharge to the target discharged energy amount is realized early. As a result, since the regenerated energy in the control target segment can be fully collected, a decrease in energy management effect is small.

The charge/discharge planning part 55 determines the vehicle traveling load of the segment located before the control target segment to a value lower than a reference value. The reference value is a vehicle traveling load calculated on the basis of the average vehicle speed V0. The charge/discharge planning part 55 calculates a vehicle traveling load by correcting the average vehicle speed V0 to the vehicle speed V1 lower than the average vehicle speed V0. Accordingly, the vehicle traveling load is determined to a value lower than the reference value. The charge/discharge planning part 55 plans the discharge on the basis of the vehicle traveling plan determined to a value lower than the reference value.

A graph of a solid line in FIG. 3 is an energy management effect by a discharge plan created on the basis of the vehicle speed V1 (after correction of the average vehicle speed V0). The graph of the solid line of FIG. 3 corresponds to a graph of a broken line moved toward a lower speed side. When the vehicle M travels at the vehicle speed V1 lower than the average vehicle speed V0, since the discharge is executed according to the discharge plan, the energy management effect is maximized. When the vehicle M travels at a speed higher than the vehicle speed V1, since the discharge to the target discharged energy is realized early, a decrease in energy management effect is small. Even when the vehicle M travels at a speed different from the average vehicle speed V0, the vehicle M is likely to travel at a speed close to the average vehicle speed V0. Since the average vehicle speed V0 is higher than the vehicle speed V1, a decrease in energy management effect is reduced.

Figure 4:
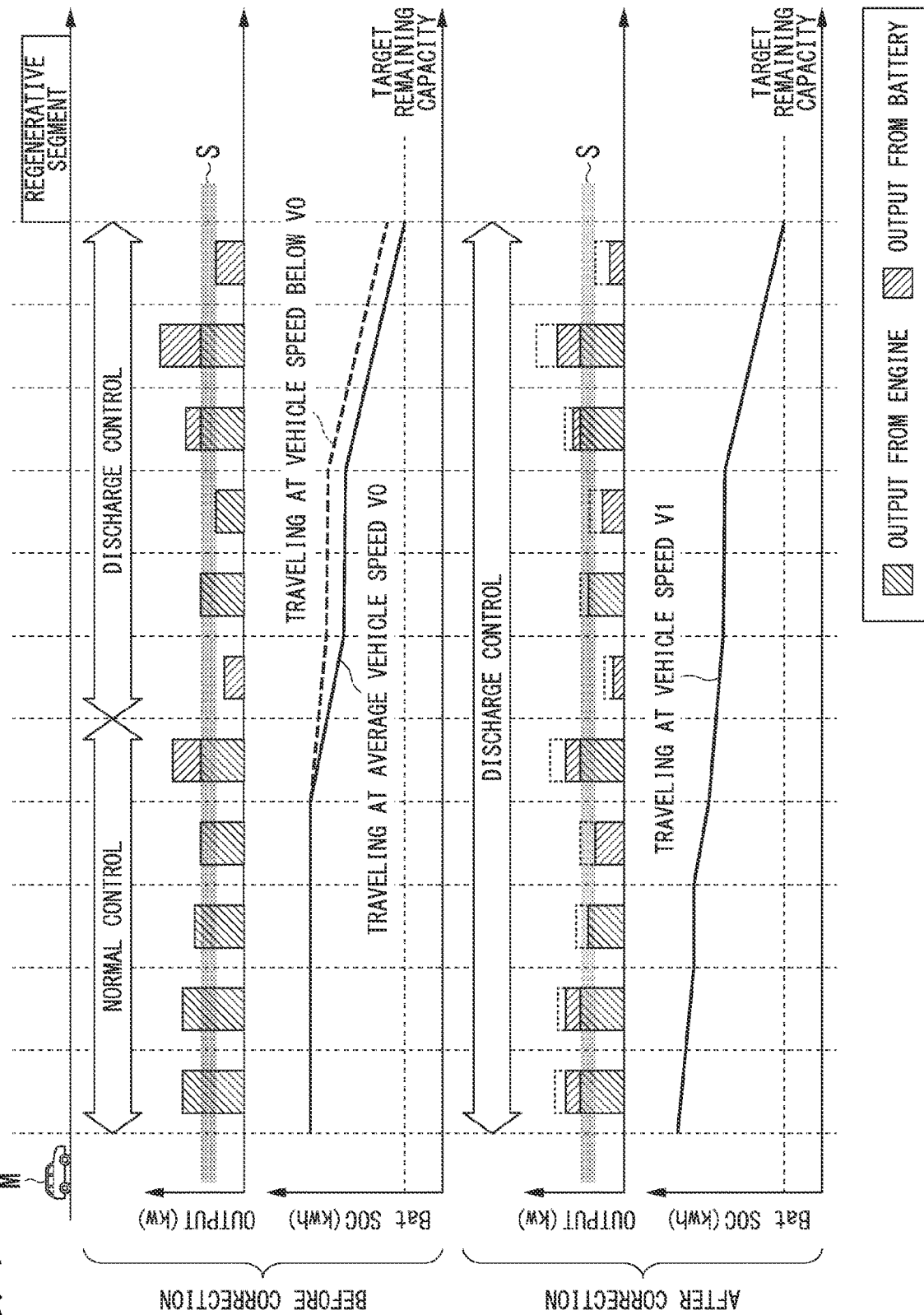
FIG. 4 is a view showing an example of a discharge plan and a change in remaining capacity of a battery.

FIG. 4 is a view showing an example of a discharge plan and a change in remaining capacity of the battery. A lateral axis of FIG. 4 is a position of the vehicle M. An upper half section of FIG. 4 is before correction of the average vehicle speed V0, an upper side of which is a graph of output of the discharge plan, and a lower side of which is a graph of a change in remaining capacity of the battery. The charge/discharge planning part 55 plans the discharge control with a plurality of segments immediately before the control target segment (regeneration segment). In the segment before the discharge control segment, normal control is planned. The normal control is control of maintaining a state of charge (SOC) of the battery within a fixed range. That is, when the state of charge of the battery is lower than the reference value, the charge is actively performed, and when the state of charge of the battery is higher than the reference value, the discharge is actively performed. The vehicle traveling load is a sum of the engine output and the battery output. In the segment of the normal control in FIG. 4, the entire vehicle traveling load is covered only by the engine output, and the state of charge of the battery is maintained constant. In FIG. 4, an output area (engine efficiency output) with good thermal efficiency of the engine is indicated by S. In the segment of the discharge control, a portion of the vehicle traveling load up to the engine efficiency output S is covered by the engine output, and a portion exceeding the engine efficiency output S is covered by the battery output. The state of charge of the battery is decreased by the battery output. Before correction of the average vehicle speed V0, the discharge plan is created on the basis of the average vehicle speed V0. When the vehicle M travels at the average vehicle speed V0, the state of charge of the battery at the starting point of the control target segment is decreased to the target remaining capacity. On the other hand, when the vehicle M travels at a vehicle speed below the average vehicle speed V0, the battery output is smaller than the discharge plan before correction. For this reason, the state of charge of the battery at the starting point of the control target segment is not decreased to the target remaining capacity.

A lower half section of FIG. 4 is after correction of the average vehicle speed V0 to the vehicle speed V1, an upper side of which is a graph of output of the discharge plan, and a lower side of which is a graph of a change in remaining capacity of the battery. Since the vehicle speed V1 is smaller than the average vehicle speed V0, the vehicle traveling load of the discharge plan after correction is smaller than the discharge plan before correction. Accordingly, the battery output of the discharge plan after correction is smaller than the discharge plan before correction. The charge/discharge planning part 55 plans to start the discharge control from the segment further before correction. After correction of the average vehicle speed V0 to the vehicle speed V1, the discharge plan is created on the basis of the vehicle speed V1. When the vehicle M travels at the vehicle speed V1, the state of charge of the battery at the starting point of the control target segment is decreased to the target remaining capacity. When the vehicle M travels at a vehicle speed close to the average vehicle speed V0 (>V1), the battery output is greater than in the discharge plan created on the basis of the vehicle speed V1. For this reason, the state of charge of the battery before the control target segment is decreased to the target remaining capacity. Accordingly, the regenerative electric power in the control target segment (regeneration segment) can be fully collected.

In this way, when it is determined that the control target segment is the regeneration segment, since the discharge plan is set from a more early segment at a state in which the discharge amount is underestimated by underestimating the vehicle traveling load, it is possible to set up a discharge plane having a margin. Both vehicles having actual vehicle speeds faster than and slower than the average vehicle speed V0 can reduce the remaining capacity of the electrical storage device before entering the regeneration segment, and the regenerative electric power can be fully collected. In particular, even in the case of a driver who tends to have a lower vehicle speed than the average vehicle speed V0, it is possible to minimize adverse effects on the energy management effect due to driving properties.

Figure 5:
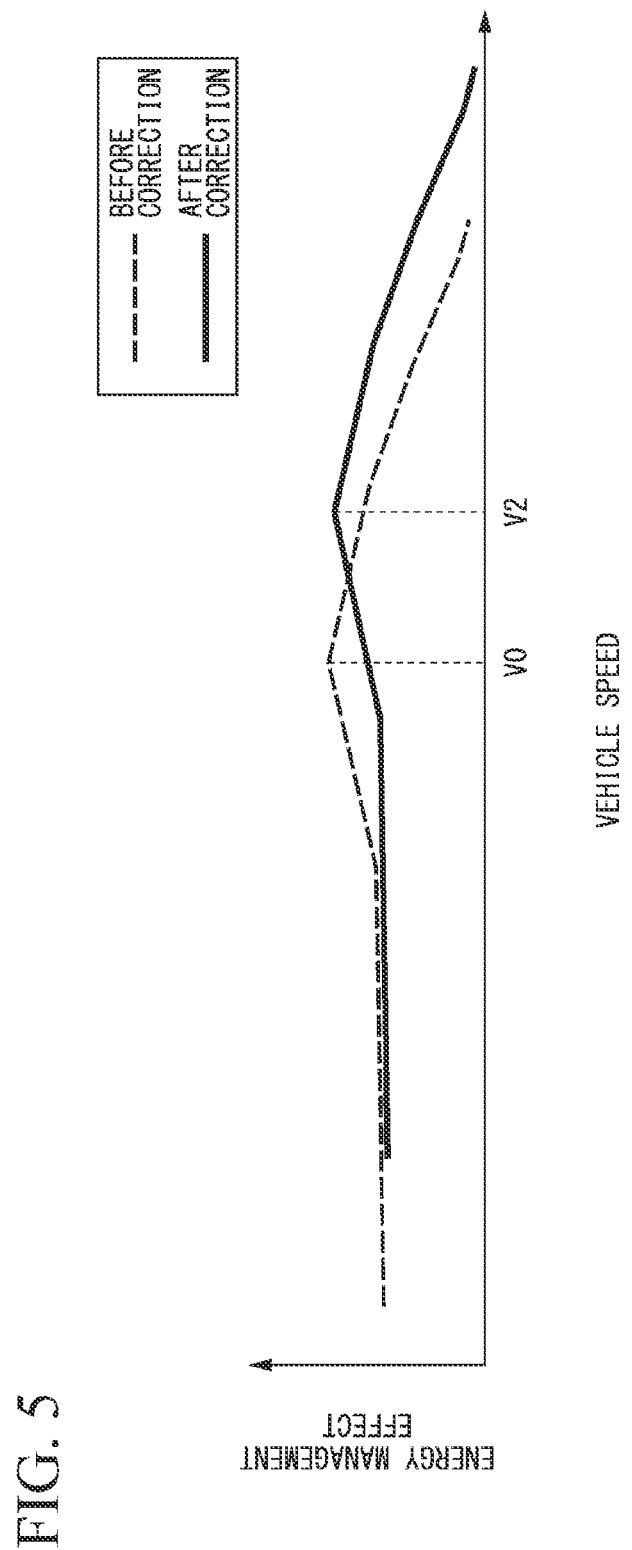
FIG. 5 is a graph showing a relation between a vehicle speed and an energy management effect in the case of a charge plan.

FIG. 5 is a graph showing a relation between the vehicle speed and the energy management effect in the case of the charge plan. A graph of a broken line of FIG. 5 is an energy management effect by the charge plan created on the basis of the average vehicle speed V0 (before correction of the average vehicle speed V0). When the vehicle M travels at the average vehicle speed V0, since the charge is performed according to the charge plan, the energy management effect is maximized. When the vehicle M travels at a vehicle speed higher than the average vehicle speed V0, the vehicle traveling load calculated using the mathematical expression 1 is increased. In this case, since the chance of charging the battery using engine output is decreased and the battery output is increased, the charge to the target charge electric energy may not be realized. Accordingly, the electric power of the battery 60 cannot be supplied to the second motor 18 while the vehicle M travels the control target segment. As a result, it is difficult to secure the vehicle traveling load in the control target segment, and the energy management effect is decreased. As the vehicle M travels at a vehicle speed higher than the average vehicle speed V0, a decrease in energy management effect is increased.

When the vehicle M travels at a vehicle speed lower than the average vehicle speed V0, the vehicle traveling load calculated using the mathematical expression 1 is reduced. In this case, since the chance of charging the battery using engine output is increased and the battery output is reduced, the charge to the target charge electric energy is realized early. Accordingly, the electric power of the battery 60 can be supplied to the second motor 18 while the vehicle M travels the control target segment. As a result, since the vehicle traveling load is secured by assistance from the charge electric power of the battery 60 in the control target segment, a decrease in energy management effect is small.

The charge/discharge planning part 55 determines the vehicle traveling load of the segment disposed in front of the control target segment to a value higher than the reference value. The reference value is a vehicle traveling load calculated on the basis of the average vehicle speed V0. The charge/discharge planning part 55 calculates a vehicle traveling load by correcting the average vehicle speed V0 to a vehicle speed V2 higher than the average vehicle speed V0. Accordingly, the vehicle traveling load is determined as a value higher than the reference value. The charge/discharge planning part 55 plans the charge on the basis of the vehicle traveling plan determined as the value higher than the reference value.

A graph of a solid line in FIG. 5 is an energy management effect by the charge plan created on the basis of the vehicle speed V2 (after correction of the average vehicle speed V0). The graph of the solid line in FIG. 5 corresponds to a graph of a broken line moved to a high speed side. When the vehicle M travels at the vehicle speed V2, since the charge is performed according to the charge plan, the energy management effect is maximized. When the vehicle M travels at a speed lower than the vehicle speed V2, since the charge to the target charge electric energy is realized early, a decrease in energy management effect is small. Even when the vehicle M travels at a speed different from the average vehicle speed V0, the vehicle M is likely to travel at a speed close to the average vehicle speed V0. Since the average vehicle speed V0 is lower than the vehicle speed V2, a decrease in energy management effect is reduced.

Figure 6:
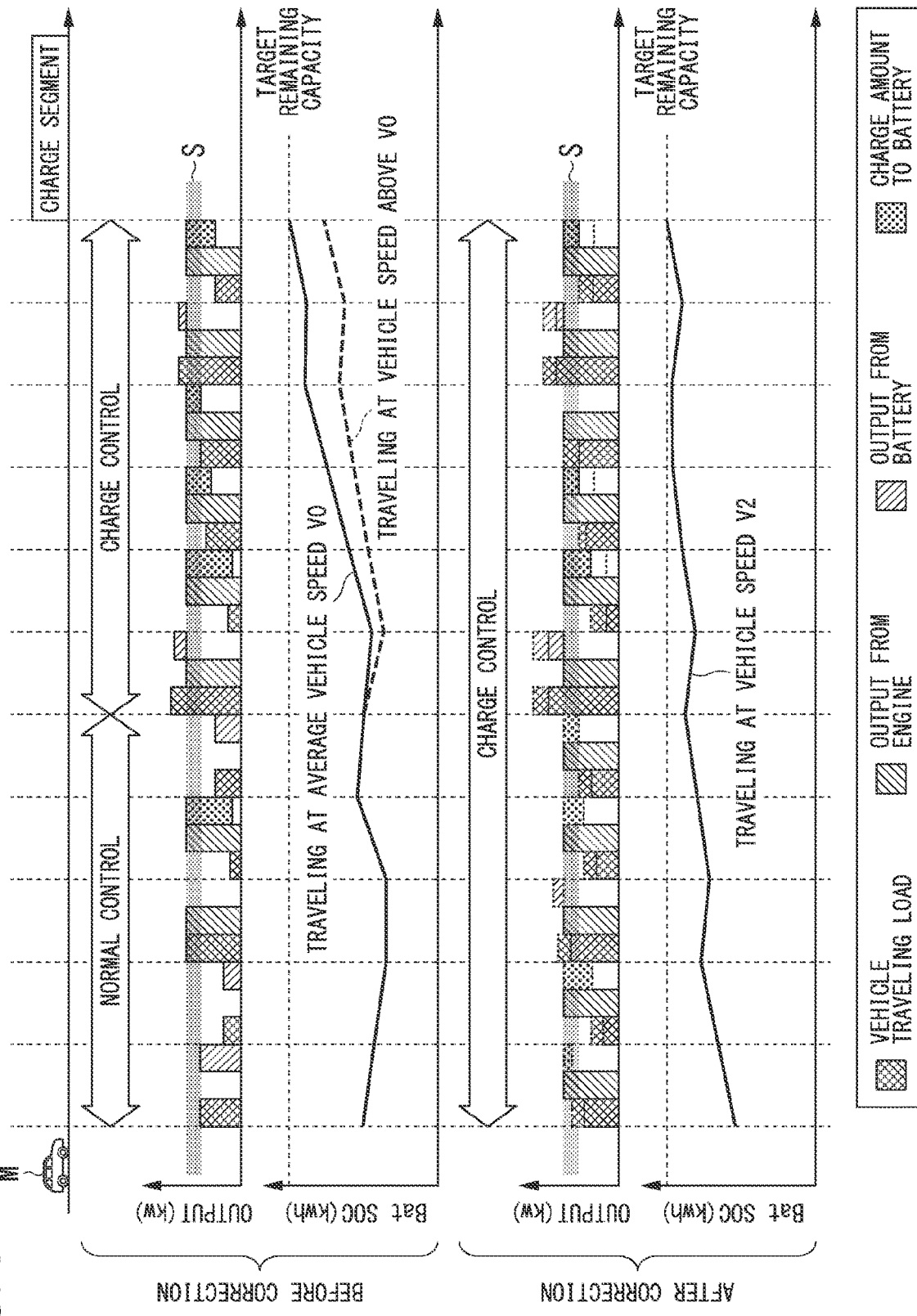
FIG. 6 is a view showing an example of a charge plan and a change in remaining capacity of a battery.

FIG. 6 is a view showing an example of a charge plan and a change in remaining capacity of the battery. A lateral axis of FIG. 6 is a position of the vehicle M. An upper half section of FIG. 6 is before correction of the average vehicle speed V0, an upper side of which is a graph of output of the charge plan, and a lower side of which is a graph of a change in remaining capacity of the battery. The charge/discharge planning part 55 plans the charge control with a plurality of segment immediately before a control target segment (discharge segment). In the segment before the charge control segment, normal control is planned. The vehicle traveling load is a sum of the engine output and the battery output. A charge amount to the battery can be considered as a negative battery output. In the segment of the normal control, the vehicle traveling load is covered by the engine output or battery output. The battery charge is planned same as the battery output, and the state of charge of the battery is maintained substantially constant. In the segment of the charge control, even when the vehicle traveling load is below the engine efficiency output S, the engine output is planned to the engine efficiency output S. The battery charge is planned by the engine output that is above the vehicle traveling load. The chances of battery charge are increased and the state of charge of the battery is increased. Before correction of the average vehicle speed V0, the charge plan is created on the basis of the average vehicle speed V0. When the vehicle M travels at the average vehicle speed V0, the state of charge of the battery at the starting point of the control target segment is increased to the target remaining capacity. On the other hand, when the vehicle M travels at a vehicle speed above the average vehicle speed V0, since the vehicle traveling load becomes greater than the discharge plan, the battery charge amount is reduced. For this reason, the state of charge of the battery at the starting point of the control target segment is not increased to the target remaining capacity.

A lower half section of FIG. 6 is after correction of the average vehicle speed V0 to the vehicle speed V2, an upper side of which is a graph of output of the charge plan, and a lower side of which is a graph of a change in remaining capacity of the battery. Since the vehicle speed V2 is greater than the average vehicle speed V0, the vehicle traveling load of the charge plan after correction is greater than the charge plan before correction. Accordingly, the battery charge amount of the charge plan after correction is smaller than the charge plan before correction. The charge/discharge planning part 55 plans to start the charge control from the segment further before correction. After correction of the average vehicle speed V0 to the vehicle speed V2, the charge plan is created on the basis of the vehicle speed V2. When the vehicle M travels at the vehicle speed V2, the state of charge of the battery at the starting point of the control target segment is increased to the target remaining capacity. When the vehicle M travels at a vehicle speed close to the average vehicle speed V0 (<V2), the battery charge amount becomes larger than the discharge plan created on the basis of the vehicle speed V2. For this reason, the state of charge of the battery before the control target segment is increased to the target remaining capacity. Accordingly, the traveling can be assisted using the battery output in the control target segment (discharge segment).

In this way, when it is determined that the control target segment is a discharge segment, since the charge plan is set up from a more early segment in a state in which the charge amount is underestimated by overestimating the vehicle traveling load, it is possible to set up a charge plan having a margin. Both vehicles having actual vehicle speeds faster than and slower than the average vehicle speed V0 can increase the remaining capacity of the battery 60 before entering the discharge segment, and the assistance electric power in the discharge segment can be secured. In particular, even in the case of a driver who tends to have a higher vehicle speed than the average vehicle speed, it is possible to minimize the adverse effects on the energy management effect due to driving properties.

As described above, the road information acquisition part 52 acquires the average vehicle speed V0 of the segment before the control target segment. The charge/discharge planning part 55 calculates a vehicle traveling load by correcting the average vehicle speed V0. The road information acquisition part 52 may acquire a vehicle traveling load instead of acquisition of the average vehicle speed V0. However, since the vehicle traveling load is also affected by a vehicle specification or the like, only the vehicle traveling load of the vehicle specification similar to the vehicle M can be used. On the other hand, statistics information of many vehicles becomes available by acquiring the average vehicle speed V0 and calculating the vehicle traveling load. Accordingly, even when the driver travels the scheduled traveling route for the first time, the vehicle traveling load with high accuracy can be obtained. The charge/discharge planning part 55 may calculate a vehicle traveling load from the average vehicle speed V0 before correction instead of calculation of the vehicle traveling load from the average vehicle speed V0 after correction, and correct the calculated vehicle traveling load. The road information acquisition part 52 may acquire a regulated limit (for example, a legal speed) of the segment before the control target segment. The charge/discharge planning part 55 may correct the speed limit and calculate the vehicle traveling load.

The plurality of speeds of vehicles traveling the segment before the control target segment may be widely distributed. When the vehicle speed distribution is great, the vehicle speed of the vehicle M may be significantly different from the average vehicle speed V0. As described above, the road information acquisition part 52 acquires road information of the scheduled traveling route. The road information includes vehicle speed distribution information. The charge/discharge planning part 55 determines a corrected amount of the average vehicle speed V0 on the basis of the vehicle speed distribution information. The charge/discharge planning part 55 increases the correction amount of the average vehicle speed V0 as the vehicle speed distribution of the segment before the control target segment is greater. Accordingly, even when the vehicle speed of the vehicle M is far from the average vehicle speed V0, a decrease in energy management effect is reduced. Accordingly, a correction amount appropriate for each of the traveling segments can be set.

When the segment before the control target segment is an expressway, when many lane numbers are provided, or the like, the vehicle speed distribution is likely to be wide. When the vehicle speed distribution is great, the vehicle speed of the vehicle M may be far from the average vehicle speed V0. As described above, the road information acquisition part 52 acquires road information of the scheduled traveling route. The road information includes road attribute information. The road attribute information includes information of road classification (expressway or general road) and information of a lane number. The charge/discharge planning part 55 determines a correction amount of the average vehicle speed V0 on the basis of the road attribute information. The charge/discharge planning part 55 causes the correction amount of the average vehicle speed V0 to be greater than in the general road when the segment before the control target segment is expressway. The charge/discharge planning part 55 causes the correction amount of the average vehicle speed V0 to become greater as the lane number of the segment before the control target segment is greater. Accordingly, even when the vehicle speed of the vehicle M is far from the average vehicle speed V0, a decrease in energy management effect is reduced. Accordingly, it is possible to set the corrected amount appropriate for each of the traveling segments.

As described above, the target remaining capacity calculation part 54 calculates a target remaining capacity that is a remaining capacity of the battery 60 at the starting point of the control target segment. When a difference between the current remaining capacity and the target remaining capacity of the battery 60 is great, the target discharged energy amount or target charge electric energy amount in the segment before the control target segment is increased. In this case, when the vehicle M travels at a speed far from the average vehicle speed V0, the target discharged energy amount or target charge electric energy amount may not be achieved. The charge/discharge planning part 55 determines a correction amount of the average vehicle speed V0 according to the difference between the current remaining capacity and the target remaining capacity of the battery 60. The charge/discharge planning part 55 causes the correction amount of the average vehicle speed V0 to become greater as the difference between the current remaining capacity and the target remaining capacity of the battery 60 is increased. Accordingly, it is possible to promote or suppress the charge/discharge, and it is possible to more reliably execute the charge/discharge control. Accordingly, even when the vehicle speed of the vehicle M is far from the average vehicle speed V0, a decrease in energy management effect is reduced.

When a distance or time until the vehicle M arrives at the starting point of the control target segment from the current position, if the vehicle M travels at a speed far from the average vehicle speed V0, the target discharged energy or target charge electric energy may not be accomplished. The charge/discharge planning part 55 determines a correction amount of the average vehicle speed V0 on the basis of the distance or time until the vehicle M arrives at the starting point of the control target segment. The charge/discharge planning part 55 causes the correction amount of the average vehicle speed V0 to become greater as the distance or time until the vehicle M arrives at the starting point of the control target segment is reduced. Accordingly, since the charge/discharge capacity can be adjusted based on the degree of urgency, the charge/discharge can be performed more appropriately. Accordingly, even when the vehicle speed of the vehicle M is far from the average vehicle speed V0, a decrease in energy management effect is reduced.

(Vehicle Control Method)

Figure 7:
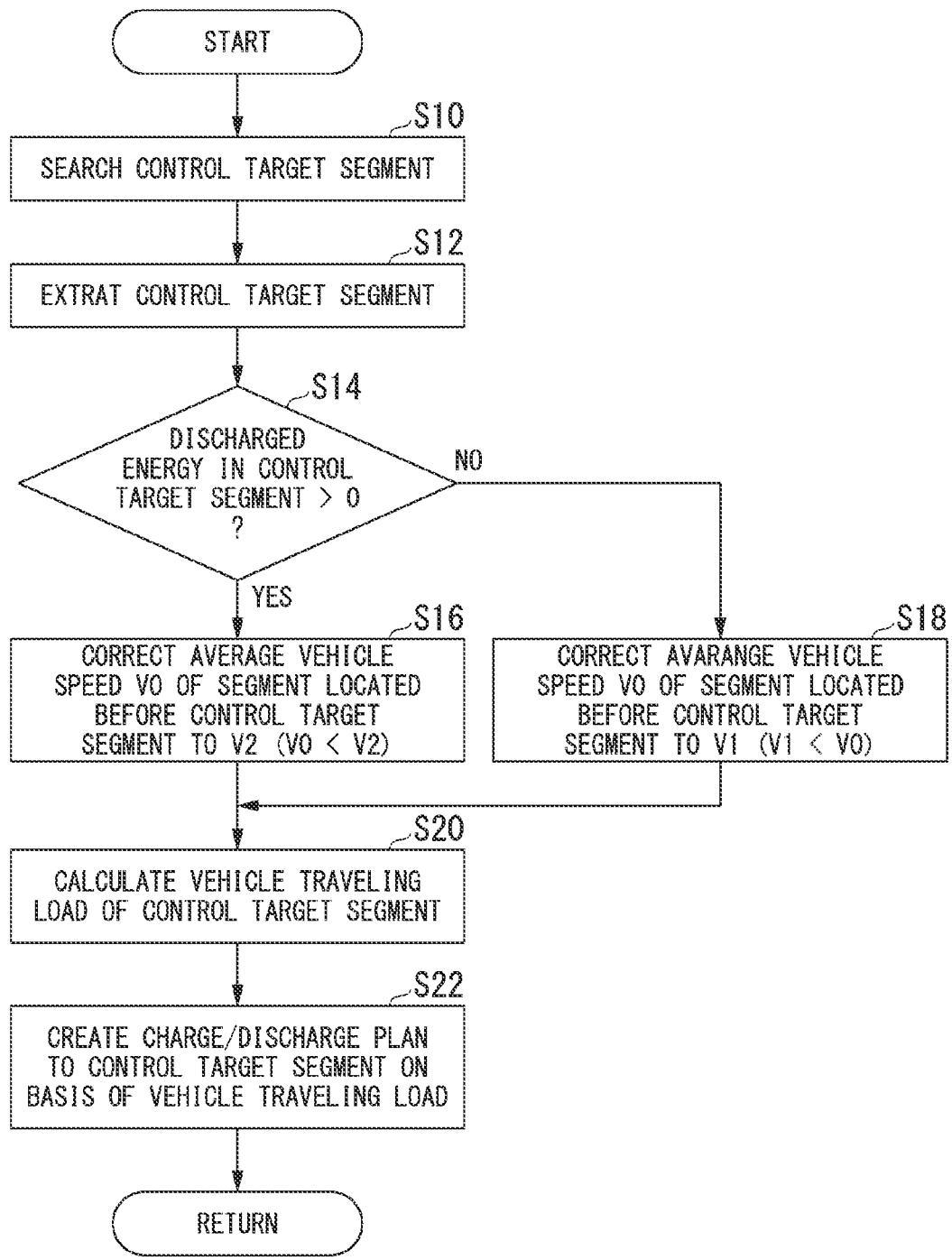
FIG. 7 is a flowchart showing an example of a flow of processing executed by a control device.

A control method of the vehicle M of the embodiment will be described. FIG. 7 is a flowchart showing an example of a flow of processing executed by the control device 50. First, the road information acquisition part 52 searches for a control target segment in a scheduled traveling route (step S10). Next, the road information acquisition part 52 acquires event information of each segment in the scheduled traveling route of the vehicle M. Next, the control target segment extraction part 53 acquires regenerated energy amount or discharged energy amount due to traveling of an event generating segment. Next, control target segment extraction part 53 extracts a control target segment, in which a change of the remaining capacity of the battery 60 equal to or greater than the predetermined value is predicted, on the scheduled traveling route (step S12). Next, the charge/discharge planning part 55 determines whether an estimated value of the discharged energy amount in the control target segment is greater than 0 (step S14). When the estimated value of the discharged energy amount in the control target segment is greater than 0, the charge/discharge planning part 55 corrects the average vehicle speed V0 of the segment located before the control target segment to the vehicle speed V2 greater than V0 (step S16). When the estimated value of the discharged energy amount in the control target segment is equal to or smaller than 0, the charge/discharge planning part 55 corrects the average vehicle speed V0 of the segment located before the control target segment to the vehicle speed V1 smaller than V0 (step S18). Next, the charge/discharge planning part 55 calculates a vehicle traveling load in the road from the vehicle M to the control target segment on the basis of the vehicle speed V1 or V2 (step S20). Next, the charge/discharge planning part 55 creates a charge/discharge plan to the control target segment on the basis of the vehicle traveling load (step S22).

Figure 8:
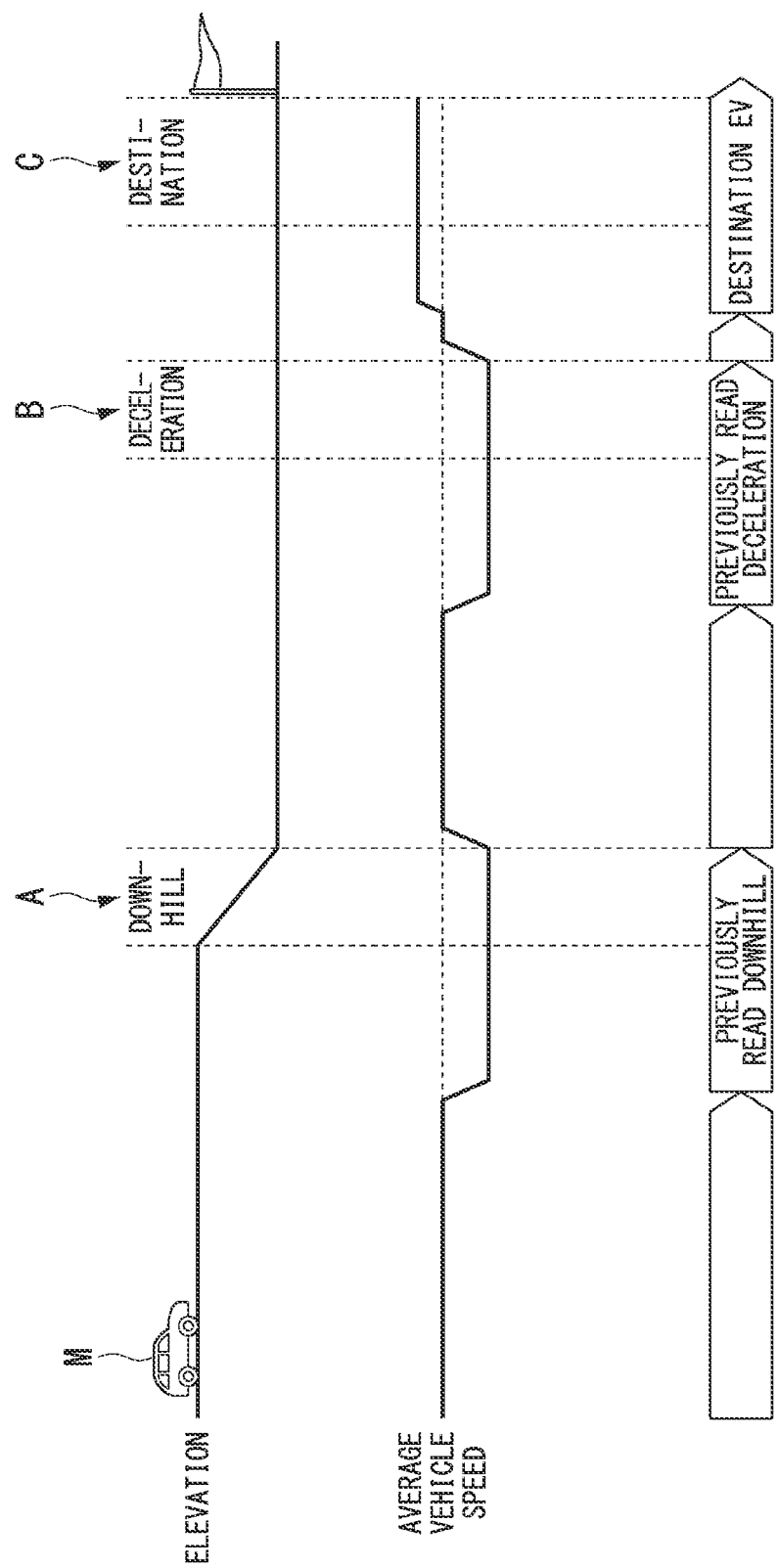
FIG. 8 is a view showing an example of a traveling aspect of the vehicle.

FIG. 8 is a view showing an example of the traveling aspect of the vehicle. The road information acquisition part 52 acquires information of a traveling downhill (downgrade) as road information of a segment A of the scheduled traveling route. The control target segment extraction part 53 extracts the segment A as the control target segment when the estimated value of the regenerated energy amount of the segment A is equal to or greater than the threshold. The charge/discharge planning part 55 corrects the average vehicle speed V0 of the segment located before the control target segment A to the vehicle speed V1 smaller than V0. The charge/discharge planning part 55 calculates a vehicle traveling load on the basis of the vehicle speed V1, and creates a discharge plan to the control target segment A. In this way, the control device 50 predicts the traveling downhill of the segment A and creates the discharge plan.

The road information acquisition part 52 acquires information of deceleration due to temporary stopping position or the like as road information of a segment B of the scheduled traveling route. The control target segment extraction part 53 extracts the segment B as the control target segment when the estimated value of the regenerated energy of the segment B is equal to or greater than the threshold. The charge/discharge planning part 55 corrects the average vehicle speed V0 of the segment located before the control target segment B to the vehicle speed V1 smaller than V0. The charge/discharge planning part 55 calculates a vehicle traveling load on the basis of the vehicle speed V1 and creates a discharge plan to the control target segment B. In this way, the control device 50 predicts deceleration of the segment B and creates a discharge plan.

The road information acquisition part 52 acquires information of a destination (a quiet place such as a residential area or the like) as road information of a segment C of the scheduled traveling route. The control target segment extraction part 53 extracts the segment C as the control target segment when the estimated value of the discharged energy amount of the segment C is equal to or greater than the threshold. The charge/discharge planning part 55 corrects the average vehicle speed V0 of the segment located before the control target segment C to the vehicle speed V2 greater than V0. The charge/discharge planning part 55 calculates a vehicle traveling load on the basis of the vehicle speed V2 and creates a charge plan to the control target segment C. In this way, the control device 50 creates a charge plan in which the vehicle travels in the vicinity of the destination of the segment C in an EV traveling mode.

According to the control device 50 of the above-mentioned vehicle M, the control device 50 of the vehicle M includes the engine 10, the battery 60, and the second motor 18 connected to the driving wheels 25, able to be driven by supply of electric power from the battery 60 and configured to supply regenerative electric power generated upon a regenerative operation to the battery 60, the road information acquisition part 52 configured to acquire road information related to a scheduled traveling route of the vehicle M, the control target segment extraction part 53 configured to extract a control target segment, in which a change of a remaining capacity of the battery 60 equal to or greater than a predetermined value is predicted, on the scheduled traveling route, and the charge/discharge planning part 55 configured to plan charge/discharge of the battery 60 on the basis of the vehicle traveling load in a road from the vehicle M to a control target segment, and the charge/discharge planning part 55 can determine a vehicle traveling load of a segment located before a control target segment according to an event generated in the control target segment, adjust a charge/discharge capacity of an electrical storage device and minimize an influence due to driving properties in order to determine a vehicle traveling load of the segment located before the control target segment according to attributes of the control target segment.

The above-mentioned embodiment can be expressed as follows.

A vehicle control device includes:
a storage device in which a program is stored; and
a hardware processor,
wherein the hardware processor executes the program stored in the storage device, and thus,
the vehicle control device is configured to:
acquire road information related to a scheduled traveling route of the vehicle;
extract a control target segment, in which a change of a remaining capacity of an electrical storage device equal to or greater than a predetermined value is predicted, on the scheduled traveling route;
plan charge/discharge of the electrical storage device on the basis of a vehicle traveling load in a road from the vehicle to the control target segment; and
determine the vehicle traveling load of a segment located before the control target segment according to an attribute of the control target segment when the charge/discharge of the electrical storage device is planned.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle control device comprising:
a power source;
an electrical storage device;
an electric motor connected to a driving wheel, able to be driven by supply of electric power from the electrical storage device, and configured to supply regenerative electric power generated upon a regenerative operation to the electrical storage device;
a road information acquisition part configured to acquire road information related to a scheduled traveling route of a vehicle;
a control target segment extraction part configured to extract a control target segment, in which a change of a remaining capacity of the electrical storage device equal to or greater than a predetermined value is predicted, of the scheduled traveling route; and a charge/discharge planning part configured to plan charge/discharge of the electrical storage device based on a vehicle traveling load in a plurality of segments on a road from a current position of the vehicle to the control target segment,
wherein
the charge/discharge planning part is configured to:
   determine the vehicle traveling load of the plurality of segments located before the control target segment according to an attribute of the control target segment,
   calculate the vehicle traveling load based on vehicle speed information indicating a vehicle speed included in the road information,
   determine the vehicle traveling load by correcting the vehicle speed,
   in response to determining that an estimated value of a regenerated energy amount in the control target segment is equal to or greater than a threshold, (i) correct the vehicle speed in the plurality of segments located before the control target segment to a speed lower than a reference speed and (ii) set a larger number of segments in which a discharge control of the electrical storage device is performed in the plurality of segments than before the vehicle speed was corrected to the speed lower than the reference speed, and
   in response to determining that an estimated value of a discharged energy amount of the control target segment is equal to or greater than a threshold, (i) correct the vehicle speed in the plurality of segments located before the control target segment to a speed higher than a reference speed and (ii) set a larger number of segments in which a charge control of the electrical storage device is performed in the plurality of segments than before the vehicle speed was corrected to the speed higher than the reference speed.

2. The vehicle control device according to claim 1, wherein the road information acquisition part is configured to acquire vehicle speed distribution information included in the road information, and
   the charge/discharge planning part is configured to determine a correction amount of the vehicle speed based on the vehicle speed distribution information.

3. The vehicle control device according to claim 1, wherein the road information acquisition part is configured to acquire road attribute information, and
   the charge/discharge planning part is configured to determine a correction amount of the vehicle speed based on the road attribute information.

4. The vehicle control device according to claim 1, further comprising a target remaining capacity calculation part configured to calculate a target remaining capacity that is a remaining capacity of the electrical storage device at a starting point of the control target segment,
   wherein the charge/discharge planning part is configured to determine a correction amount of the vehicle speed according to a difference between the remaining capacity and the target remaining capacity of the electrical storage device.

5. The vehicle control device according to claim 1, wherein the charge/discharge planning part is configured to determine a correction amount of the vehicle speed based on a distance or time until the vehicle arrives at a starting point of the control target segment.

6. A vehicle control method executed by a computer mounted in a vehicle, the method comprising:
   acquiring road information related to a scheduled traveling route of the vehicle;
   extracting a control target segment, in which a change of a remaining capacity of an electrical storage device equal to or greater than a predetermined value is predicted, of the scheduled traveling route;
   planning charge/discharge of the electrical storage device based on a vehicle traveling load in a plurality of segments on a road from a current position of the vehicle to the control target segment;
   determining the vehicle traveling load of the plurality of segments located before the control target segment according to an attribute of the control target segment when charge/discharge of the electrical storage device is planned;
   calculating the vehicle traveling load based on vehicle speed information indicating a vehicle speed included in the road information;
   determining the vehicle traveling load by correcting the vehicle speed;
   in response to determining that an estimated value of a regenerated energy amount in the control target segment is equal to or greater than a threshold:
      (i) correcting the vehicle speed in the plurality of segments located before the control target segment to a speed lower than a reference speed, and
      (ii) setting a larger number of segments in which a discharge control of the electrical storage device is performed in the plurality of segments than before the vehicle speed was corrected to the speed lower than the reference speed; and
   in response to determining that an estimated value of a discharged energy amount of the control target segment is equal to or greater than a threshold:
      (i) correcting the vehicle speed in the plurality of segments located before the control target segment to a speed higher than a reference speed, and
      (ii) setting larger number of segments in which a charge control of the electrical storage device is performed in the plurality of segments than before the vehicle speed was corrected to the speed higher than the reference speed.

7. A non-transitory computer-readable recording medium storing a program configured to cause a computer mounted in a vehicle to:
   acquire road information related to a scheduled traveling route of the vehicle;
   extract a control target segment, in which a change of a remaining capacity of an electrical storage device equal to or greater than a predetermined value is predicted, from the scheduled traveling route;
   plan charge/discharge of the electrical storage device based on a vehicle traveling load on a road from the vehicle to the control target segment; and
   determine the vehicle traveling load of a segment located before the control target segment according to an attribute of the control target segment when charge/discharge of the electrical storage device is planned,
   calculate the vehicle traveling load based on vehicle speed information indicating a vehicle speed included in the road information;
   determine the vehicle traveling load by correcting the vehicle speed;
   in response to determining that an estimated value of a regenerated energy amount in the control target segment is equal to or greater than a threshold:

(i) correct the vehicle speed in the plurality of segments located before the control target segment to a speed lower than a reference speed, and
(ii) set a larger number of segments in which a discharge control of the electrical storage device is performed in the plurality of segments than before the vehicle speed was corrected to the speed lower than the reference speed; and in response to determining that an estimated value of a discharged energy amount of the control target segment is equal to or greater than a threshold:
(i) correct the vehicle speed in the plurality of segments located before the control target segment to a speed higher than a reference speed, and
(ii) set larger number of segments in which a charge control of the electrical storage device is performed in the plurality of segments than before the vehicle speed was corrected to the speed higher than the reference speed.

\* \* \* \* \*